United States Patent
Venetianer et al.

(10) Patent No.: US 7,613,324 B2
(45) Date of Patent: Nov. 3, 2009

(54) DETECTION OF CHANGE IN POSTURE IN VIDEO

(75) Inventors: Peter L. Venetianer, McLean, VA (US); Andrew J. Chosak, Arlington, VA (US); Niels Haering, Reston, VA (US); Alan J. Lipton, Herndon, VA (US); Zhong Zhang, Herndon, VA (US); Weihong Yin, Herndon, VA (US)

(73) Assignee: ObjectVideo, Inc, Reston, VA (US)

( * ) Notice: Subject to any disclaimer, the term of this patent is extended or adjusted under 35 U.S.C. 154(b) by 904 days.

(21) Appl. No.: 11/165,182

(22) Filed: Jun. 24, 2005

(65) Prior Publication Data

US 2006/0291694 A1 Dec. 28, 2006

(51) Int. Cl.
*G06K 9/00* (2006.01)
*H04N 7/18* (2006.01)

(52) U.S. Cl. ......... 382/103; 382/286; 348/143
(58) Field of Classification Search ......... 382/100, 382/103, 106, 168, 170, 181, 190, 193, 199–203, 382/209, 224, 232, 243, 254, 274, 276, 287–295, 382/305, 321, 286; 434/236; 700/1; 348/143; 340/573.1
See application file for complete search history.

(56) References Cited

U.S. PATENT DOCUMENTS

| | | | | |
|---|---|---|---|---|
| 6,353,764 | B1 * | 3/2002 | Imagawa et al. | 700/1 |
| 6,704,433 | B2 * | 3/2004 | Matsuo et al. | 382/103 |
| 6,757,008 | B1 * | 6/2004 | Smith | 348/143 |
| 6,796,799 | B1 * | 9/2004 | Yoshiike et al. | 434/236 |
| 7,242,306 | B2 * | 7/2007 | Wildman et al. | 340/573.1 |
| 7,460,686 | B2 * | 12/2008 | Yoda et al. | 382/103 |

\* cited by examiner

*Primary Examiner*—Seyed Azarian
(74) *Attorney, Agent, or Firm*—Venable LLP; Michael A. Sartori; Jeffri A. Kaminski

(57) ABSTRACT

Input video data is processed to detect a change in a posture of a person shown in the video data. The change of posture may be the result of an event, for example, the person falling or getting up. The input video data may include a plurality of frames. Objects in the frames are tracked and then classified, for example, as human and non-human targets. At least one of the position or location of a human target in the frames is identified. Changes in the location or position of the human target between the frames is determined. When the change in at least of the position or location exceeds a predetermined threshold, a falling down event or a getting up event is detected. The changes in the position or location of the human target can be determined based on a number of different factors.

20 Claims, 8 Drawing Sheets

DETECTION OF CHANGE IN POSTURE IN VIDEO

BACKGROUND OF THE INVENTION

1. Field of the Invention

This invention generally relates to surveillance systems. Specifically, the invention relates to a video-based surveillance system that can be used, for example, to detect when a person falls or gets up.

2. Related Art

Some state-of-the-art intelligent video surveillance (IVS) system can perform content analysis on frames generated by surveillance cameras. Based on user-defined rules or policies, IVS systems may be able to automatically detect events of interest and potential threats by detecting, tracking and classifying the targets in the scene. For most IVS applications the overall tracking of objects is sufficient: that already enables e.g. detecting when an object enters a restricted area, or when an object is left behind or taken away. In other applications, however, some further granularity is needed. The detection of change in posture, for example, when a person falls or gets up, is an example of this. Detecting such events is important in a wide range of applications, including dispatching help quickly, especially in hospitals, nursing homes, or in the homes of the sick or the elderly; for liability reduction; or in security applications when guarding people.

SUMMARY OF THE INVENTION

Embodiments of the invention include a method, a system, an apparatus, and an article of manufacture for automatic detection of change in posture. Such embodiments may involve computer vision techniques to automatically detect the change of posture and other such events by detecting, tracking, and analyzing people. This technology has applications in a wide range of scenarios.

Embodiments of the invention may include a machine-accessible medium containing software code that, when read by a computer, causes the computer to perform a method for automatic detection of change in posture comprising the steps of: performing change detection on the input surveillance video; detecting targets; tracking targets; classifying targets as human or non-human; optionally detecting and tracking the head of the tracked person; optionally tracking the body parts of the person; and detecting a change in posture.

A system used in embodiments of the invention may include a computer system including a computer-readable medium having software to operate a computer in accordance with embodiments of the invention.

An apparatus according to embodiments of the invention may include a computer including a computer-readable medium having software to operate the computer in accordance with embodiments of the invention.

An article of manufacture according to embodiments of the invention may include a computer-readable medium having software to operate a computer in accordance with embodiments of the invention.

Exemplary features of various embodiments of the invention, as well as the structure and operation of various embodiments of the invention, are described in detail below with reference to the accompanying drawings.

BRIEF DESCRIPTION OF THE DRAWINGS

The foregoing and other features of various embodiments of the invention will be apparent from the following, more particular description of such embodiments of the invention, as illustrated in the accompanying drawings, wherein like reference numbers generally indicate identical, functionally similar, and/or structurally similar elements.

DEFINITIONS

Figure 1B:
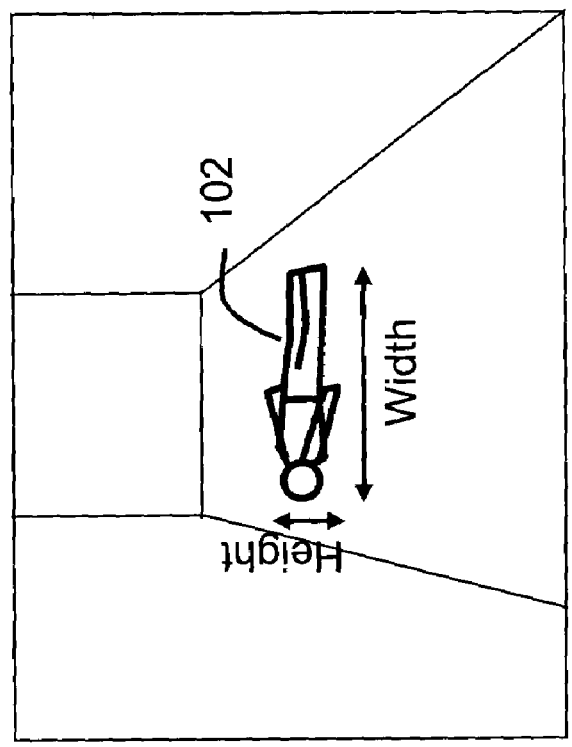
FIGS. 1A and 1B depict how falling sideways may result in a significant change in aspect ratio from a largely vertical standing position to a largely horizontal fallen position.

A "video" refers to motion pictures represented in analog and/or digital form. Examples of video include: television, movies, image sequences from a video camera or other observer, and computer-generated image sequences.

A "frame" refers to a particular image or other discrete unit within a video.

An "object" refers to an item of interest in a video. Examples of an object include: a person, a vehicle, an animal, and a physical subject.

An "activity" refers to one or more actions and/or one or more composites of actions of one or more objects. Examples of an activity include: entering; exiting; stopping; falling; getting up; moving; raising; lowering; growing; and shrinking.

A "place" refers to a space where an activity may occur. A location can be, for example, scene-based or image-based. Examples of a scene-based location include: a public space; a store; a retail space; an office; a warehouse; a hotel room; a hotel lobby; a lobby of a building; a casino; a bus station; a train station; an airport; a port; a bus; a train; an airplane; and a ship. Examples of an image-based location include: a video image; a line in a video image; an area in a video image; a rectangular section of a video image; and a polygonal section of a video image.

An "event" refers to one or more objects engaged in an activity. The event may be referenced with respect to a location and/or a time.

A "computer" refers to any apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a workstation; a micro-computer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include: a magnetic hard disk; a floppy disk; an optical disk, such as a CD-ROM and a DVD; a magnetic tape; a memory chip; and a carrier wave used to carry computer-readable electronic data, such as those used in transmitting and receiving e-mail or in accessing a network.

"Software" refers to prescribed rules to operate a computer. Examples of software include: software; code segments; instructions; computer programs; and programmed logic.

A "computer system" refers to a system having a computer, where the computer comprises a computer-readable medium embodying software to operate the computer.

DETAILED DESCRIPTION OF EMBODIMENTS OF THE PRESENT INVENTION

Exemplary embodiments of the invention are discussed in detail below. While specific exemplary embodiments are discussed, it should be understood that this is done for illustration purposes only. A person skilled in the relevant art will recognize that other components and configurations can be used without parting from the spirit and scope of the invention.

Detecting the change of posture of a person has several intelligent video surveillance (IVS) applications. Automatic, real-time detection and alerting in case of a person falling or getting up can be advantageous in a wide variety of situations. Such detection and alerting may enable dispatching help quickly and automatically in places like malls, stores, parking lots, assisted living communities, hospitals, or during duress monitoring in law enforcement. An alert may even be a life saver in the homes of elderly or sick people living alone, who may not be able to get up and ask for help after falling. In some of these scenarios the quick detection of the person slipping and falling, and the ensuing fast response may help reduce liability as well. Another liability aspect is to help avoid frivolous lawsuits by customers claiming to have fallen and having video evidence proving the contrary or that the fall was intentional. The detection of a person getting up also has several applications. Detection of a person getting up can help guards in law enforcement. It can also be very helpful in hospitals, e.g. in intensive care units to detect if a person gets up, which if unnoticed can put the patient's life at risk.

The detection of falling and getting up are complementary problems. If a video stream contains a falling event when played forward, the same video played backward will contain a getting up event. Hence the same algorithmic considerations can be used for both cases. In the discussions below, the focus is on describing the detection of falling, but a person skilled in the art can easily apply the same concepts and algorithms to the detection of a person getting up.

In an exemplary embodiment of the invention, input video data is processed to detect a change in a posture of a person shown in the video data. The change of posture may be the result of an event, for example, the person falling or getting up. The input video data may be of a place and may include a plurality of frames. Objects in the frames are tracked and then classified, for example, as human and non-human targets. At least one of the position or location of a human target in the frames is identified. Changes in the location or position of the human target between the frames is determined. When the change in at least of the position or location exceeds a predetermined threshold, a falling down event or a getting up event is detected. The changes in the position or location of the human target can be determined based on a number of different factors, as discussed below.

Figure 1A:
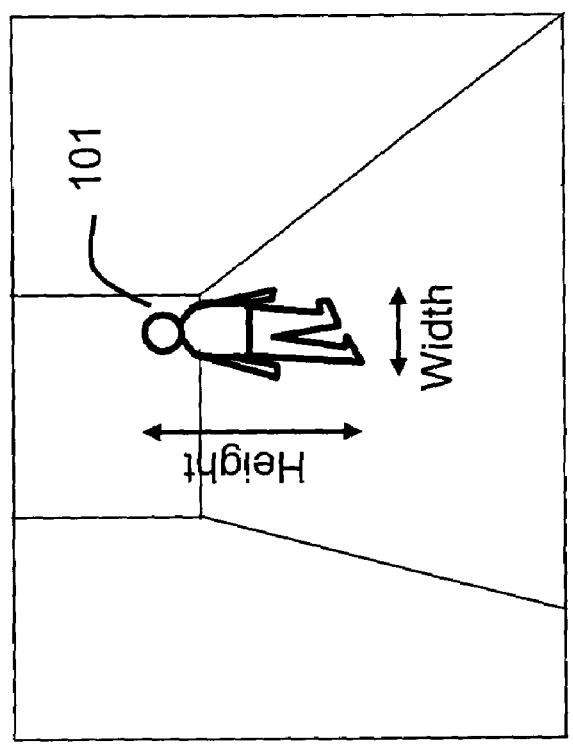

An exemplary embodiment of the invention detects a person falling (or getting up) based on a change in at least one of the height or aspect ratio of the tracked person object. FIGS. 1A and 1B are examples of frames of video data of a place, for example a room in the home of an elderly person. As illustrated in FIGS. 1A and 1B, a person 101 standing is largely in a vertical position, while a person 102 who has fallen down is in largely horizontal position. The difference between the standing and fallen positions can be detected using the aspect ratio, i.e. the ratio of the width (W) and the height (H) of the person. As shown in FIG. 1A, the height of a standing person 101 is much greater than their width. Accordingly, the aspect ratio (W/H) of a typical standing person 101 is well below one. As shown in FIG. 1B, the height of a fallen person is much less than their width. Accordingly, the aspect ratio of a person laying on the ground 102 is well above one.

The frames of the input video data may be processed to determine a change in the aspect ratio of a person. The height, location and position of the person can be compared between the different frames. When the change in the aspect ratio exceeds a selected threshold, a change in posture, such as a falling down event if the change is an increase in the aspect ratio, or a getting up event if the change is a decrease in the aspect ratio, may be detected. The amount of change in the aspect ratio that indicates a change in posture depends on the specific implementation. For example, the selected threshold may depend on the video camera parameters, such as the viewing angle. Indicating a falling event based on a relatively smaller change, for example, when 1.2<larger aspect ratio/smaller aspect ratio<1.5, in the aspect ratio may result in a greater number of false alarms compared to missed detections. On the other hand indicating a falling event based on a relatively larger change may result in a greater number of missed detections compared to false alarms. The threshold used may be based on, among other things, the place being monitored, the user's preferences and their willingness to tolerate false alarms or missed detections.

Figure 2B:
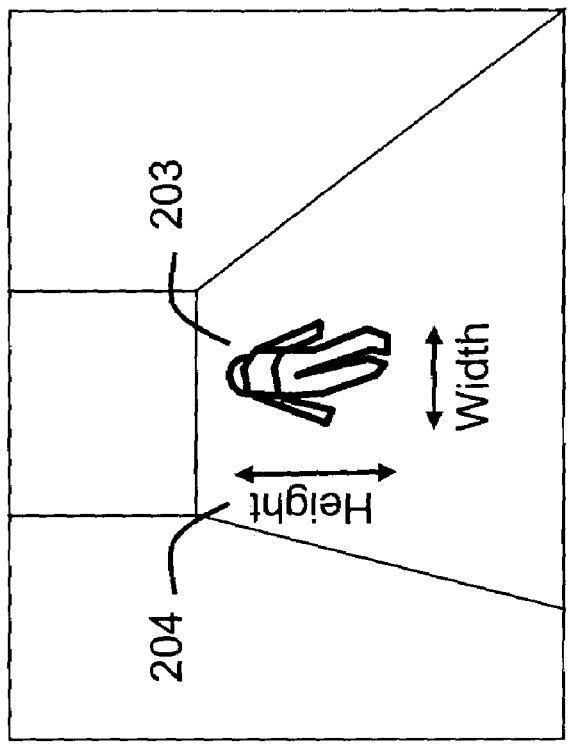
FIGS. 2 and 2B depict how falling towards or away from the camera may result in a significant change in the detected height of the tracked person.

FIG. 1B shows frame of video data in which a person has fallen essentially perpendicular to the camera viewing direction. If a person falls substantially parallel to the camera viewing direction, that is, towards or away from the camera, as depicted in FIG. 2B, the change in aspect ratio might be less pronounced. The aspect ratio of the person may be less than one both when a person is standing and when a person has fallen. Basing the detection of a falling event only on a change in aspect ratio in such a case may result in an unacceptable number of false alarms and/or missed detections. Thus, a change in the overall height of the person object may be used to indicate that the person has fallen.

Figure 2A:
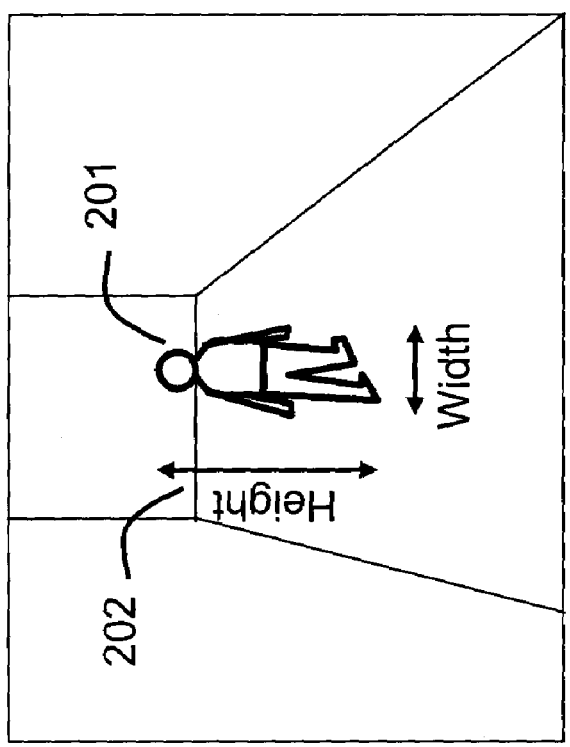

As can be seen in FIG. 2A, the height 202 of the standing person 201 is significantly greater than the height 204 of the fallen person 203. For example, a quotient of the greater height divided by the smaller height that is greater than 1.5 may indicate a "significantly greater" height. The frames of the video data can be processed to detect a change in the overall height of the person. When the change in height exceeds a predetermined threshold, a change in posture is detected. The amount of change in the height that indicates a change in posture depends on the specific implementation. The change in height can be used alone or in conjunction with a change in aspect ratio to detect a change in posture. A change in one or both of aspect ratio or height that exceeds predetermined thresholds may be required for an event to be detected.

Figure 3B:
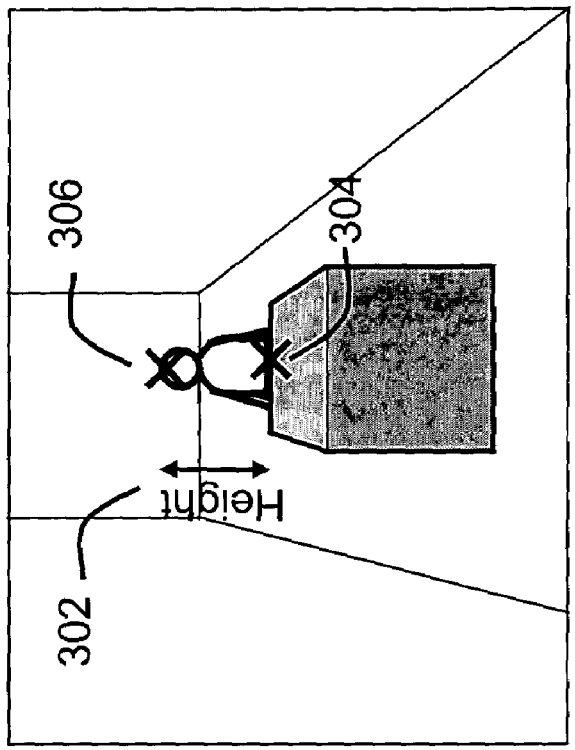
FIGS. 3A and 3B depict how the location of the topmost and bottommost point of the person may be used to eliminate false alarms caused by an occlusion.
Figure 3A:
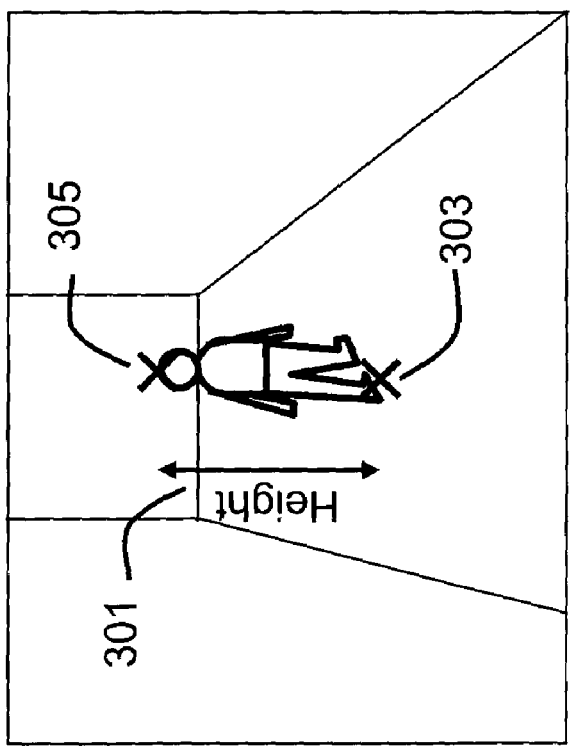

False alarms and missed detections may occur, even if event detection is based on a change in both aspect ratio and height. For example, as depicted in FIGS. 3A and 3B, if an object occludes the bottom of the person, the height of the person changes significantly (301 vs. 302), but a falling event has not occurred. Indicating a falling event in this case would be a false alarm. Some additional factors may help the IVS system to reduce false alarms and avoid missed detections. For example the locations of the top and bottom of the tracked object in the video data can be used to avoid false alarms. In FIG. 3B, the person has walked behind another object in the scene, for example a desk. The bottommost point of the person (303 and 304) changes significantly when they pass behind the object, while the topmost point (305 and 306) does not change. This is in contrast to the falling down event, where a similar change in height may occur, but is largely due to the top of the person moving down with the bottommost point staying unchanged. For example, in the falling event shown in FIG. 2, the top of the person moves towards the ground, with the bottom point remaining unchanged. Accordingly, a falling event may be indicated by the top of the object moving down, while the bottommost stays in place. The tracking of the top and bottom of the object may be coupled with the requisite change in height or aspect ratio to detect an event. For example, a change in height that exceeds the predetermined threshold to indicate a falling down event may be measured. However, the top of the object does not move down. This is the case shown in FIGS. 3A and 3B. The change in height exceeds the predetermined threshold. However, a falling down event would not be indicated in this case, as the top of the person did not move down. Coupling the tracking of the top and bottom of the object with a change in height prevents a false alarm in this case.

Figure 4B:
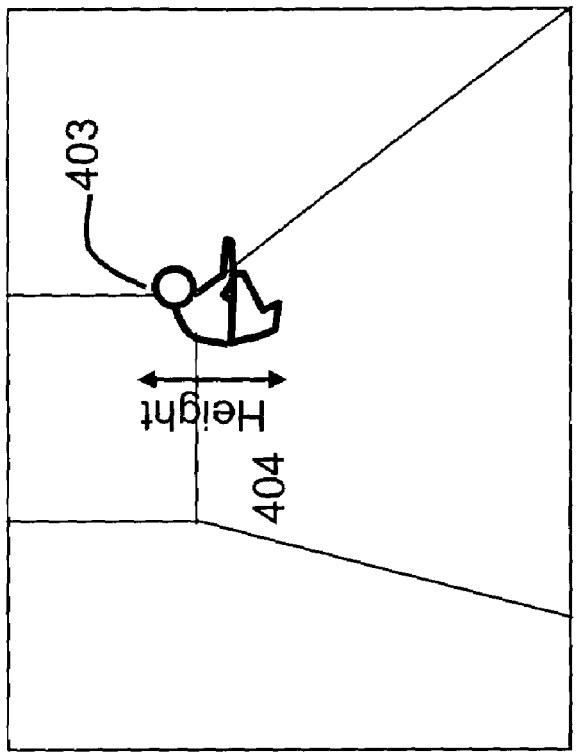
FIGS. 4A and 4B depict how a person just bending down may result in a false alarm.
Figure 4A:
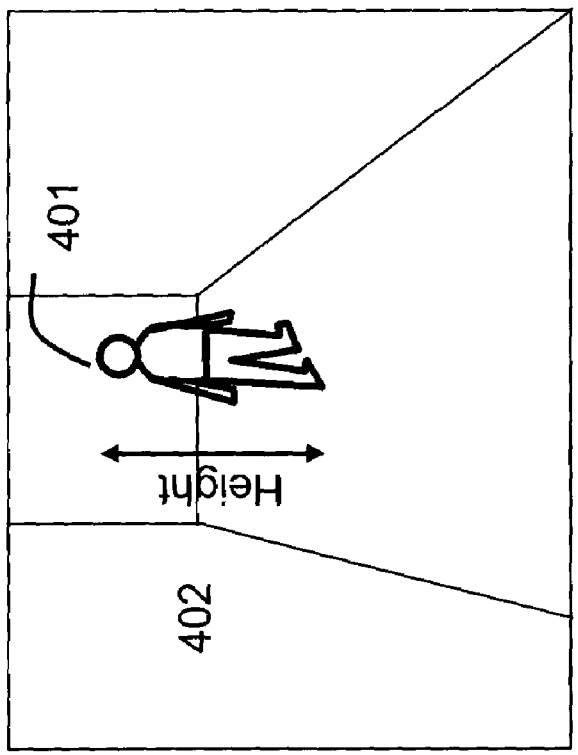

In a further embodiment of the invention, the speed and/or the duration of the change in aspect ratio or height of the object may also help avoid false alarms. FIG. 4 shows a standing person 401 and a person bending down 403. The height of a person may change significantly even if the person only bends down, for example, to get an item from a bottom shelf in a store. The height 402 of the standing person 401 is clearly greater than the height 404 of the person bending down 403. However, even though there is a change in the height, this is not a falling event. Falling is normally more sudden than bending down. Additionally, it typically takes a person longer to return to a standing position after falling down. The speed or duration of the change in aspect ratio or height should meet predefined limits in order for a falling event to be indicated. The speed or duration of the change in the aspect ratio or height that indicates a change in posture depends on the specific implementation. The speed and/or the duration of the change in aspect ratio or height of the object may be used alone or in any combination with the previously discussed factors to detect an event. For example, when a person bends down, a change in height occurs that indicates a falling event and the top of the person moves down, also indicating a falling event. However, the speed of the change does not meet the predefined level. Therefore, a falling event is not indicated.

Figure 5B:
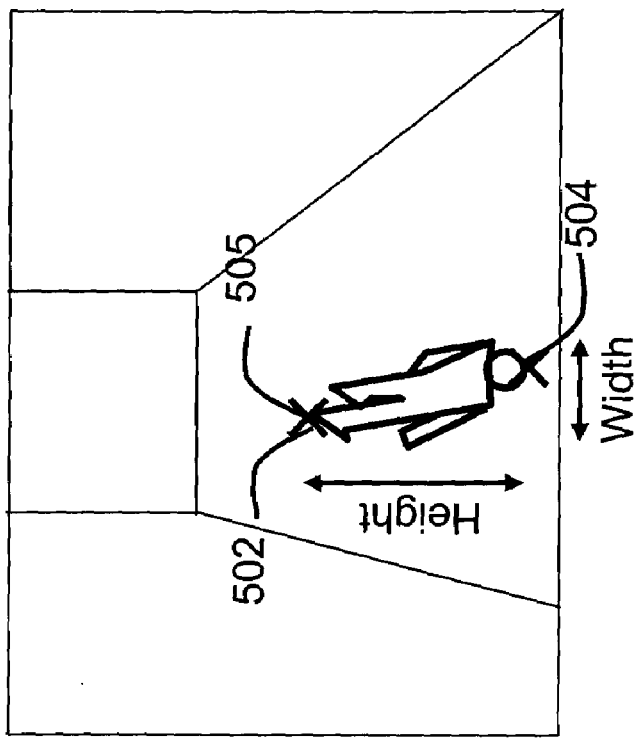
FIGS. 5A and 5B depict how the trajectory of a tracked person may be used to eliminate missing the detection of a person falling towards the camera.
Figure 5A:
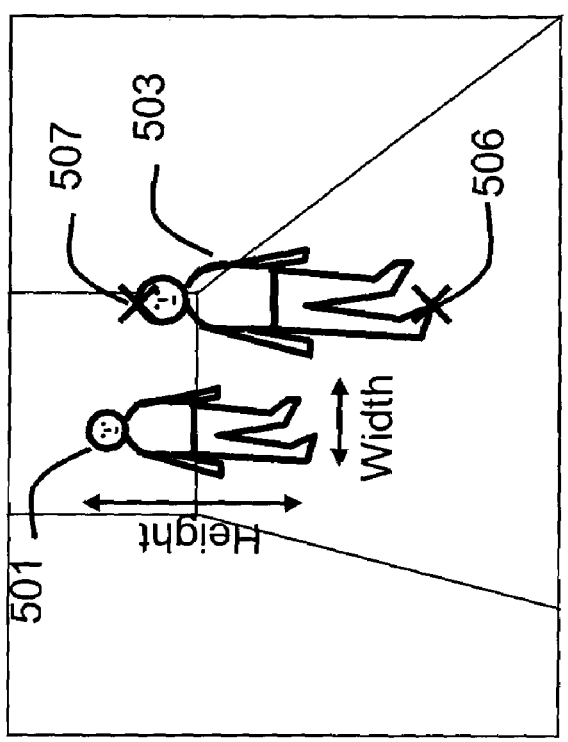
Figures 6A, 6B, 6C, 6D:
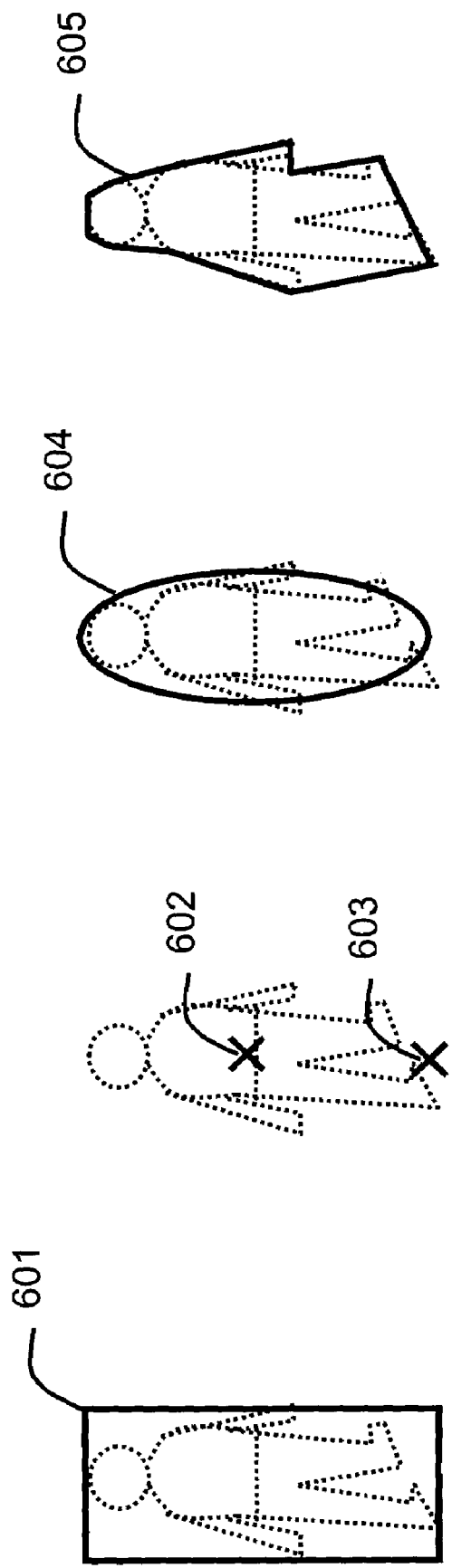
FIGS. 6A-6D depict simple shape models the IVS system may use to describe tracked objects.

Another factor, a trajectory of the person, may be used to avoid a missed detection or false alarm. As depicted in FIGS. 5A and 5B, a person falling towards a camera may be of approximately the same height and aspect ratio whether standing (501) or on the ground (502), so the height and aspect ratio based metrics may not detect a falling event in this case. However, based on the trajectory of the person and tracking the person through the frames of the video data, the system anticipates the tracked person to be in a particular location at a particular point in time, such as at 503. However, at the time of the actual measurement, the person is not at location and position 503, but in a different location and position, such as at 502. The sudden significant discrepancy, both the measured bottom (504) and top (505) being much lower in the frame than what is expected (506 and 507), may indicate a falling event. Again, this factor may be used alone or in any combination with the factors described above.

The above described methods provide the most natural approach if the IVS system tracks all targets with simple shape models, as depicted in FIGS. 6A-D, e.g. using a bounding box (601), a centroid (602), a "footprint" (603), an ellipse (604), a convex hull (605), etc. This approach may be applied to almost any previously stored forensic data (e.g. Lipton et al. Video Surveillance System, U.S. patent application Ser. Nos. 09/987,707 and 11/057,154, which are incorporated herein by reference), since the data relied on (target location, width, height) is part the forensic storage.

If calibration information is available, that can further help the detection. The calibration data basically tells the IVS system the expected height of a standing person at any given location, so any deviation from the calibration information may be an indication of a change in posture.

Figure 7A:
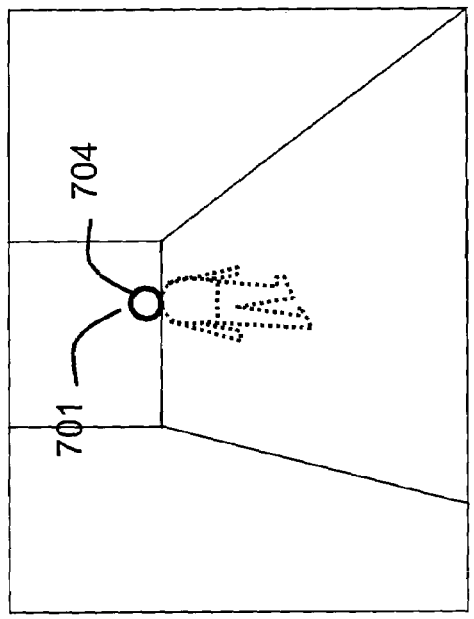
FIGS. 7A-7C depict how the head location and position information may help detecting change of posture events.
Figure 7C:
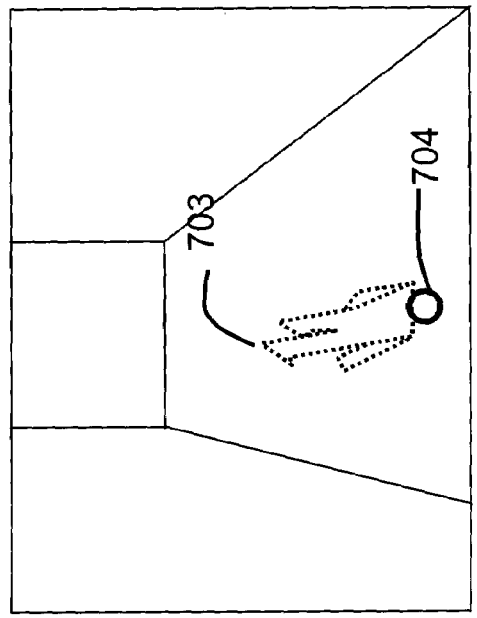
Figure 7B:
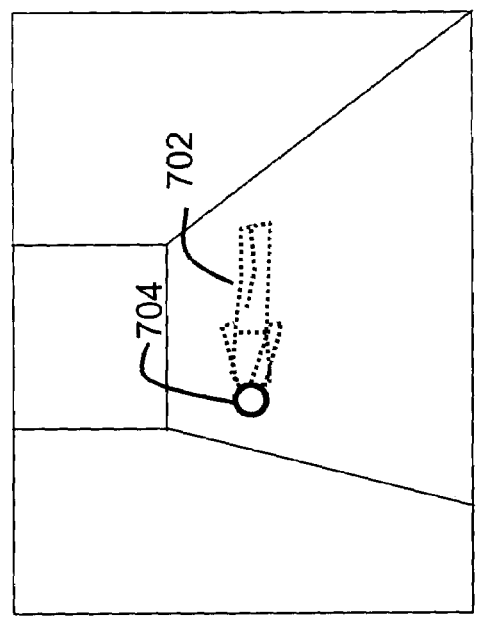

The robustness of the above described method(s) can be further improved by incorporating head information into the decision making process. In an exemplary embodiment the IVS system may detect and optionally track the head of the tracked person. Methods for the detection and tracking of the head of a person are known in the art. The location of the head and its position relative to the body may be used to detect the person falling or getting up. As depicted in FIGS. 7A-C, the location of the head 704 changes drastically between the standing (701) and fallen (702, 703) postures. Unless falling away from the camera, the head position relative to the rest of the body also changes. In the standing position the head 704 is on top of the body (701), while the head 704 is to the side of the body when falling sideways (702). The head 704 is on the bottom when falling towards the camera (703). The speed and duration of the change in head location and position may help to avoid false alarms: if a person bends down, as in FIG. 4, the head location and relative position changes similarly to a falling event (702). Falling, however, is typically more sudden. The speed and duration of the change in the position of the head must meet predefined limits for a falling event to be indicated. The limits depend on the specific implementation.

Detailed human body modeling and tracking may provide further data for the detection of falling and getting up events. Using methods known from the art may provide a detailed description of the body, including the location and position of not only the head but also that of other major body parts. Major body parts may be defined to include the head, torso, the individual limbs. The IVS system may learn the relative position and motion of these major body parts, and possibly the position and motion of other body parts as well, during falling and getting up from training sequences and use this information to detect events.

Figure 8:
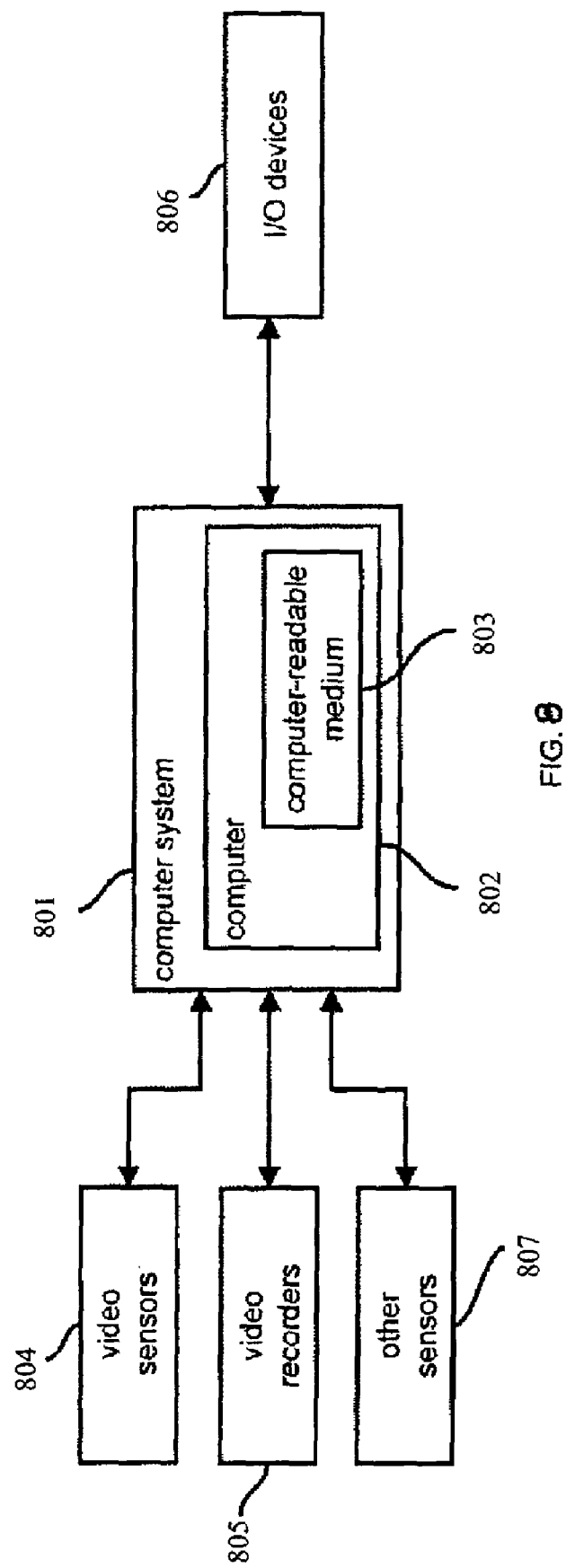
FIG. 8 illustrates a plan view of the video surveillance system of the invention.

The methods described above can be implemented using the system depicted in FIG. 8. FIG. 8 illustrates a plan view of an exemplary video surveillance system. A computer system 801 comprises a computer 802 having a computer-readable medium 803 embodying software to operate the computer 802 according to the invention. The computer system 801 is coupled to one or more video sensors 804, one or more video recorders 805, and one or more input/output (I/O) devices 806. The video sensors 804 can also be optionally coupled to the video recorders 805 for direct recording of video surveillance data. The computer system is optionally coupled to other sensors 807.

The video sensors 804 provide source video to the computer system 801. Each video sensor 804 can be coupled to the computer system 801 using, for example, a direct connection (e.g., a firewire digital camera interface) or a network. The video sensors 804 can exist prior to installation of the invention or can be installed as part of the invention. Examples of a video sensor 804 include: a video camera; a digital video camera; a color camera; a monochrome camera; a camera; a camcorder, a PC camera; a webcam; an infra-red video camera; and a CCTV camera.

The video recorders 805, which are optional, receive video surveillance data from the computer system 801 for recording and/or provide source video to the computer system 801. Each video recorder 805 can be coupled to the computer system 801 using, for example, a direct connection or a network. The video recorders 805 can exist prior to installation of the invention or can be installed as part of the invention. The video surveillance system in the computer system 11 may control when and with what quality setting a video recorder 805 records video. Examples of a video recorder 805 include: a video tape recorder; a digital video recorder; a network video recorder; a video disk; a DVD; and a computer-readable medium.

The I/O devices 806 provide input to and receive output from the computer system 801. The I/O devices 806 can be used to task the computer system 801 and produce reports from the computer system 801. Examples of I/O devices 806 include: a keyboard; a mouse; a stylus; a monitor; a printer; another computer system; a network; and an alarm. For example, notification of a falling event may be provided to emergency response personnel, such as fire and rescue personnel, store security personnel, and others by sending a notification to the respective computer systems or by sounding an alarm.

The embodiments and examples discussed herein are non-limiting examples.

The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A computer readable medium storing computer readable program code for causing a computer to perform a method, comprising the steps of:
   receiving input video data;
   detecting a target in the video data;
   tracking the target;
   identifying a target as a human; and
   detecting a change in a posture of the human target in the video data when a change in at least one of a height or aspect ratio of the human target exceeds a predetermined threshold by determining the height or the aspect ratio of the target in a first frame of the video data;
   determining the height or aspect ratio of the target in a second frame of the video data;
   calculating a difference between the height or aspect ratio of the target in the first and second frames; detecting the change in the posture when either difference exceeds a predetermined threshold;
   determining an elapsed time between the first and second frames; and
   detecting the change in the posture when the elapsed time is below a predetermined threshold.

2. The method of claim 1, further comprising:
   determining a second change in the posture has occurred based on a height or aspect ratio of the human target;
   determining a length of time between the change in posture and the second change in posture; and
   detecting the change in the posture when the elapsed time is below a predetermined threshold.

3. The method of claim 1, further comprising:
   determining the height and aspect ratio of the target in a first frame and a third frame of the video data;
   determining the length of time between the first and third frames; and
   detecting the change in posture when the time is greater than a predetermined threshold.

4. The method of claim 1, further comprising:
   tracking a top and bottom of the target; and
   detecting the change in the posture based at least in part on the location of the top and bottom of the target.

5. The method of claim 1, wherein the change in the posture is detected when the top of the target moves but the bottom remains in substantially the same location.

6. The method of claim 1, further comprising:
   measuring a height of the target; and
   detecting the change in posture based on a change in the height of the target.

7. The method of claim 1, further comprising tracking a head of the human target.

8. The method of claim 7, wherein the change in the posture is detected based on at least a location of the head.

9. The method of claim 1, further comprising:
   determining a location and position of body parts of the human target; and
   detecting the change in posture based on the location and position of the body parts.

10. The method of claim 9, further comprising:
    tracking the position and movement of major body parts during a training sequence; and
    detecting the change in posture based at least in part on a comparison of the position and movement of the major body parts in the training sequence.

11. A computer readable medium storing computer readable program code for causing a computer to perform a method, comprising the steps of:
    receiving input video data of a place including a plurality of frames;
    tracking objects in the frames;
    classifying objects in the frames as human and non-human targets;
    identifying at least one of a position or location of a human target in the frames by measuring at least one of a height or aspect ratio of the human target;
    determining changes in the location and position of the human target between frames; and
    detecting a falling event or a getting up event when the change in at least one of the position or location exceeds a predetermined threshold by calculating a difference in at least one of the height or aspect ratio between frames and determining the change in position or location based on the difference in at least one of the aspect ratio and height determining a trajectory of the human target;
    predicting at least one of a height and position of the human target at a point in time utilizing calibration information to predict the height or position of the human target;

comparing at least one of the predicted height or position to the actual height or position; and detecting the falling event or the getting up event based on at least a difference between the predicted and actual height or position.

12. The method of claim 11, wherein the determining step comprises tracking a top and bottom of the target; and detecting the falling event or getting up event based at least in part on movement of the top and bottom of the target.

13. The method of claim 12, wherein the falling event is detected when the top of the target moves but the bottom remains in substantially the same location.

14. The method of claim 11, wherein the determining step comprises:

determining a height of the target; and detecting the falling event or getting up event based at least in part on a change in the height of the target.

15. The method of claim 11, further comprising tracking a head of the human target.

16. The method of claim 15, further comprising detecting the falling event or getting up event based at least in part on a location of the head.

17. The method of claim 11, further comprising:

measuring at least one of a speed or duration of the change is aspect ratio or height; and detecting the falling event or getting up event based at least in part on the speed or duration of the change.

18. The method of claim 11, wherein the place is one of a hospital, store, parking lot, mall, or assisted living community.

19. The method of claim 11, further comprising sending an alert regarding the occurrence of the falling down or getting up event.

20. The method of claim 19, wherein the alert is provided to at least one of hospital staff, security personnel, emergency response personnel, law enforcement.

* * * * *